US007312975B2

United States Patent
Togashi et al.

(10) Patent No.: US 7,312,975 B2
(45) Date of Patent: Dec. 25, 2007

(54) LAMINATED CAPACITOR AND MANUFACTURING METHOD THEREOF

(75) Inventors: Masaaki Togashi, Tokyo (JP); Taisuke Ahiko, Nikaho (JP)

(73) Assignee: TDK Corporation, Tokyo (JP)

( * ) Notice: Subject to any disclaimer, the term of this patent is extended or adjusted under 35 U.S.C. 154(b) by 7 days.

(21) Appl. No.: 11/473,157

(22) Filed: Jun. 23, 2006

(65) Prior Publication Data

US 2007/0064374 A1  Mar. 22, 2007

(30) Foreign Application Priority Data

Sep. 21, 2005  (JP)  ............................. 2005-274585

(51) Int. Cl.
*H01G 4/06* (2006.01)
(52) U.S. Cl. .................. 361/321.1; 361/321.2; 361/306.1; 361/306.3; 361/311; 361/313
(58) Field of Classification Search ............ 361/321.1, 361/321.2, 321.4, 321.5, 306.1, 306.3, 311–313, 361/308.1, 308.2, 302–305; 29/25.41, 25.42
See application file for complete search history.

(56) References Cited

U.S. PATENT DOCUMENTS

| 6,072,690 | A  | * | 6/2000 | Farooq et al. ............ 361/321.2 |
| 6,215,647 | B1 | * | 4/2001 | Naito et al. ................. 361/303 |
| 6,407,907 | B1 | * | 6/2002 | Ahiko et al. ............. 361/306.3 |
| 6,885,541 | B2 | * | 4/2005 | Otsuka et al. ........... 361/306.3 |
| 6,999,300 | B2 | * | 2/2006 | Togashi et al. .......... 361/306.3 |
| 2007/0064374 | A1 |   | 3/2007 | Togashi et al. |

FOREIGN PATENT DOCUMENTS

JP  2004-172602  6/2004

OTHER PUBLICATIONS

U.S. Appl. No. 11/670,528, filed Feb. 2, 2007, Togashi.
U.S. Appl. No. 11/670,525, filed Feb. 2, 2007, Togashi et al.

* cited by examiner

*Primary Examiner*—Nguyen T. Ha
(74) *Attorney, Agent, or Firm*—Oblon, Spivak, McClelland, Maier & Neustadt, P.C.

(57) ABSTRACT

A laminated capacitor includes: a dielectric body; first terminal electrodes arranged at intervals on one surface of the dielectric body; second terminal electrodes arranged at intervals on the surface of the dielectric body; first internal electrodes arranged in layers within the dielectric body; second internal electrodes arranged in layers within the dielectric body to alternate with the first internal electrodes; first outer through-hole conductors each connecting each first terminal electrode to one first internal electrode which is located closest to the surface of the dielectric body among the first internal electrodes; second outer through-hole conductors each connecting each second terminal electrode to one second internal electrode which is located closest to the surface of the dielectric body among the second internal electrodes; a first inner through-hole conductor connecting the first internal electrodes to one another; and a second inner through-hole conductor connecting the second internal electrodes to one another.

10 Claims, 11 Drawing Sheets

LAMINATED CAPACITOR AND MANUFACTURING METHOD THEREOF

BACKGROUND OF THE INVENTION

1. Field of the Invention

The present invention relates to a laminated capacitor and a method for manufacturing the same. More specifically, the present invention relates to a laminated capacitor with low equivalent series inductance (hereinafter abbreviated as ESL) and a method for manufacturing the same.

2. Description of the Related Art

Because supply voltage fluctuation considerably affects the operation of CPU or the like, a laminated capacitor has been disposed in the vicinity of CPU as means for suppressing supply voltage fluctuation to stabilize power supply.

In recent years, however, current fluctuation is becoming faster and greater with increase in operating frequency of CPU. This increases the effect of ESL of the laminated capacitor itself, causing a possibility that the total inductance including ESL of the laminated capacitor itself will affect the supply voltage fluctuation.

As a technology of reducing ESL, for example, Japanese Unexamined Patent Application Publication No. 2004-172602 discloses a laminated capacitor comprising first and second capacitors. The first capacitor has low ESL because opposite electrodes, which are embedded in a dielectric body, are connected to terminal electrodes, which are formed on a surface of the capacitor, via many through conductors; the second capacitor has large capacity because opposite electrodes, which are embedded in a dielectric body, are connected one another via a few through conductors.

In the laminated capacitor disclosed in JP 2004-172602, however, the first capacitor has a complicated structure with the many through conductors connected to the opposite electrodes. Therefore, the first and second capacitors have to be prepared separately and assembled later, which makes the laminated capacitor difficult to manufacture.

In addition, if the first and second capacitors are prepared separately and assembled later, a ceramic layer located on a lower surface of the first capacitor and a ceramic layer located on an upper surface of the second capacitor will be joined together to double the ceramic layer thickness at the joint between the first and second capacitors. The increase in ceramic layer thickness makes it difficult to reduce the thickness of the laminated capacitor and increase the capacity of the laminated capacitor.

SUMMARY OF THE INVENTION

It is an object of the present invention to provide a laminated capacitor with low ESL.

It is another object of the present invention to provide a laminated capacitor whose capacity can easily be increased.

It is still another object of the present invention to provide a laminated capacitor whose thickness can easily be reduced.

It is yet another object of the present invention to provide a method suitable for manufacturing the laminated capacitor of the present invention.

In order to achieve the above-described objects, the prevent invention provides the following laminated capacitor and first and second methods for manufacturing the same.

1. Laminated Capacitor

The laminated capacitor of the present invention comprises:
a dielectric body;
a plurality of first terminal electrodes arranged at intervals on one surface of the dielectric body;
a plurality of second terminal electrodes arranged at intervals on the surface of the dielectric body;
a plurality of first internal electrodes arranged in layers within the dielectric body;
a plurality of second internal electrodes arranged in layers within the dielectric body to alternate with the first internal electrodes;
a plurality of first outer through-hole conductors each connecting each first terminal electrode to one first internal electrode which is located closest to the surface of the dielectric body among the first internal electrodes;
a plurality of second outer through-hole conductors each connecting each second terminal electrode to one second internal electrode which is located closest to the surface of the dielectric body among the second internal electrodes;
a first inner through-hole conductor connecting the first internal electrodes to one another; and
a second inner through-hole conductor connecting the second internal electrodes to one another.

In the laminated capacitor of the present invention, as set forth above, the first terminal electrodes are arranged at intervals on one surface of the dielectric body and each connected to one first internal electrode through a corresponding one of the first outer through-hole conductors.

The second terminal electrodes are also arranged at intervals on the same surface of the dielectric body and each connected to one second internal electrode through a corresponding one of the second outer through-hole conductors.

In this construction, the high-frequency current passing through the first internal electrodes, the first outer through-hole conductors and the first terminal electrodes is in the direction opposite to the high-frequency current passing through the second internal electrodes, the second outer through-hole conductors and the second terminal electrodes. Therefore, the magnetic fields generated by the high-frequency currents cancel out each other, thereby reducing ESL.

In addition, since the first terminal electrodes are connected only to the outermost one of the first internal electrodes, which is located closest to the surface of the dielectric body, and the second terminal electrodes are also connected only to the outermost one of the second internal electrodes, which is located closest to the surface of the dielectric body, the number of through-holes may be fewer than those of JP 2004-172602, facilitating the manufacture of the laminated capacitor.

Moreover, since the first inner through-hole conductor connects the first internal electrodes to one another and the second inner through-hole conductor connects the second internal electrodes to one another, a large capacitance can be obtained from the first and second terminal electrodes with the capacitances between the first and second internal electrodes being connected in parallel through the first and second inner through-hole conductors.

Preferably, the number of the first and second inner through-hole conductors is fewer than the number of the first and second outer through-hole conductors. This prevents the area where the first and second internal electrodes are opposed to each other from being substantially reduced by disposing the first and second inner through-hole conductors, thereby enabling to obtain a large capacitance.

Decreasing the number of the first and second inner through-hole conductors also facilitates the manufacture of the laminated capacitor to reduce the cost. Since the laminated capacitor can easily be manufactured, moreover, insulation failure and short-circuit fault can be reduced to improve yields.

Since the laminated capacitor of the present invention has a simple structure with only the outermost ones of the first and second internal electrodes connected to the first and second terminal electrodes through the first and second outer through-hole conductors, it can be manufactured in a continuous process. Therefore, the laminated capacitor of the present invention can be manufactured more easily than the laminated capacitor of JP 2004-172602, which requires the first and second capacitors to be prepared separately and assembled later.

2. First Method for Manufacturing the Laminated Capacitor

The first method for manufacturing the laminated capacitor of the present invention comprises:

stacking a plurality of first green sheets, each first green sheet having a first conductive layer on a first dielectric layer with first through-hole conductors, the first through-hole conductors being configured to provide the first and second inner through-hole conductors, the first dielectric layer being configured to provide the dielectric body, the first conductive layer being configured to provide the first and second internal electrodes;

placing a second green sheet on a stack of the first green sheets, the second green sheet having a second conductive layer on a second dielectric layer with second through-hole conductors, the second through-hole conductors being configured to provide the first inner through-hole conductor and the second outer through-hole conductors, the second dielectric layer being configured to provide the dielectric body, the second conductive layer being configured to provide the one first internal electrode; and placing a third green sheet on the second green sheet, the third green sheet having third through-hole conductors in a third dielectric layer, the third through-hole conductors being configured to provide the first and second outer through-hole conductors, the third dielectric layer being configured to provide the dielectric body.

3. Second Method for Manufacturing the Laminated Capacitor

The second method for manufacturing the laminated capacitor of the present invention comprises:

placing a first green sheet, the first green sheet having a first conductive layer on a first dielectric layer with first through-hole conductors, the first through-hole conductors being configured to provide the first and second outer through-hole conductors, the first dielectric layer being configured to provide the dielectric body, the first conductive layer being configured to provide the one first internal electrode;

placing a second green sheet on the first green sheet, the second green sheet having a second conductive layer on a second dielectric layer with second through-hole conductors, the second through-hole conductors being configured to provide the first inner through-hole conductor and the second outer through-hole conductors, the second dielectric layer being configured to provide the dielectric body, the second conductive layer being configured to provide the one second internal electrode; and stacking a plurality of third green sheets on the second green sheet, each third green sheet having a third conductive layer on a third dielectric layer with third through-hole conductors, the third through-hole conductors being configured to provide the first and second inner through-hole conductors, the third dielectric layer being configured to provide the dielectric body, the third conductive layer being configured to provide the first and second internal electrodes.

According to either of the first and second manufacturing methods of the present invention, the laminated capacitor can be manufactured in a continuous process. Thus, the first and second manufacturing methods of the present invention are better than the manufacturing method of JP 2004-172602, which requires the first and second capacitors to be prepared separately and assembled later.

According to either of the first and second manufacturing methods of the present invention, moreover, the laminated capacitor can be manufactured with no local increase in ceramic layer thickness, unlike the manufacturing method of JP 2004-172602, which doubles the ceramic layer thickness at the joint between the first and second capacitors. Thus, the thickness of the laminated capacitor can easily be reduced, while the capacity of the laminated capacitor can easily be increased.

As has been described hereinabove, the present invention has at least one of the following advantages:

(1) Providing a laminated capacitor with low ESL;
(2) Providing a laminated capacitor whose capacity can easily be increased;
(3) Providing a laminated capacitor whose thickness can easily be reduced; and
(4) Providing a method suitable for manufacturing the laminated capacitor of the present invention.

The present invention will be more fully understood from the detailed description given hereinbelow and the accompanying drawings which are given by way of illustration only, and thus are not to be considered as limiting the present invention.

DESCRIPTION OF THE PREFERRED EMBODIMENTS (1) Laminated Capacitor

Figure 1:
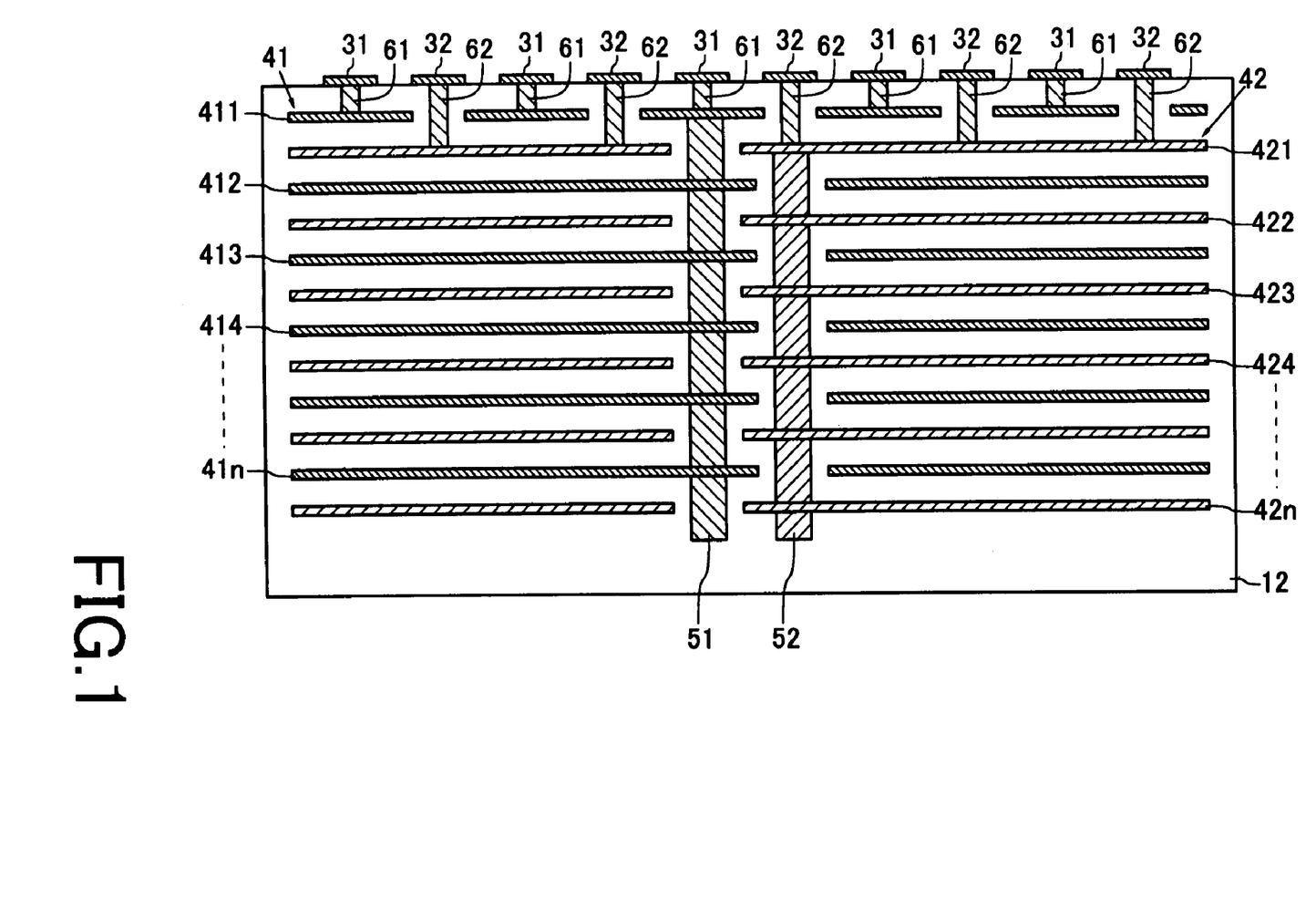
FIG. 1 is a sectional view showing a laminated capacitor according to one embodiment of the present invention.
Figure 2:
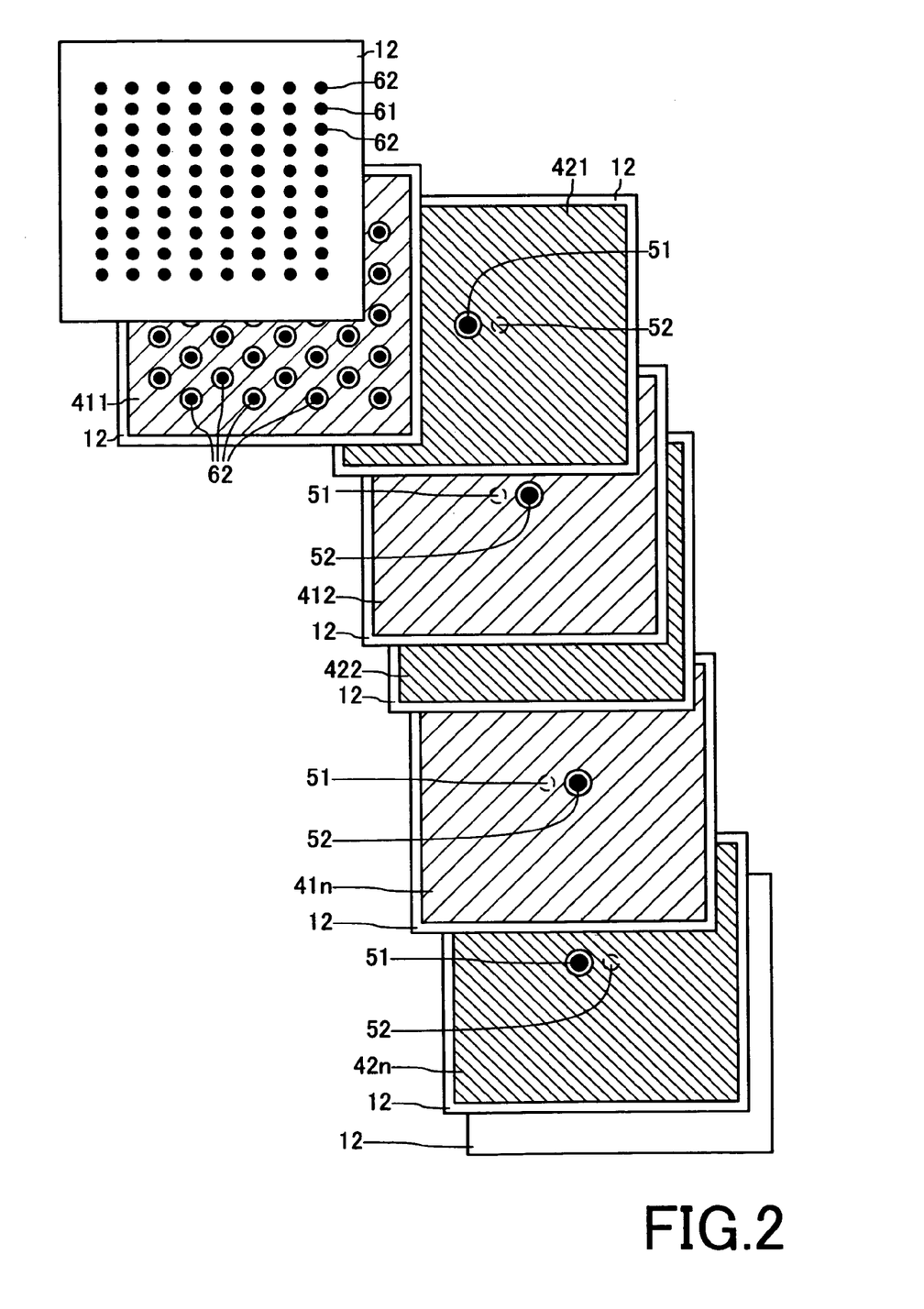
FIG. 2 is an exploded plan view of the laminated capacitor shown in FIG. 1.

Referring to FIGS. 1 and 2, a laminated capacitor comprises a dielectric body 12, first and second terminal electrodes 31, 32, first and second groups of internal electrodes 41, 42, first and second outer through-hole conductors 61, 62, and first and second inner through-hole conductors 51, 52. The dielectric body 12 may be a ceramic dielectric body. The length, width and height of the dielectric body 12 may be about 10 mm, 10 mm and 0.85 mm, respectively. Although omitted in FIG. 2, the first and second terminal electrodes 31, 32 are spaced apart and distributed over the surface of the dielectric body 12.

The first group of internal electrodes 41 includes first internal electrodes 411-41$n$ embedded in the dielectric body 12. The first internal electrodes 411-41$n$ are arranged in layers. The second group of internal electrodes 42 includes second internal electrodes 421-42$n$ embedded in the dielectric body 12. The second internal electrodes 421-42$n$ are also arranged in layers to alternate with the first internal electrodes 411-41$n$. Thus, the second internal electrodes 421-42$n$ are opposed to the first internal electrodes 411-41$n$.

Each first outer through-hole conductor 61 connects each first terminal electrode 31 to the first internal electrode 411 which is located closest, among the first internal electrodes 411-41$n$, to the surface on which the first and second terminal electrodes 31, 32 are arranged. Each second outer through-hole conductor 62 connects each second terminal electrode 32 to the second internal electrode 421 which is located closest, among the second internal electrodes 421-42$n$, to the surface on which the first and second terminal electrodes 31, 32 are arranged.

The first inner through-hole conductor 51 connects the first internal electrodes 411-41$n$ to one another. The second inner through-hole conductor 52 connects the second internal electrodes 421-42$n$ to one another.

In the laminated capacitor shown in FIGS. 1 and 2, the first and second inner through-hole conductors 51, 52 are disposed adjacent each other as a pair and centered on the first and second internal electrodes 411-41$n$, 421-42$n$.

The first and second inner through-hole conductors 51, 52 have a diameter D2 that is larger than, preferably about 4 to 16 times, a diameter of the first and second outer through-hole conductors 61, 62. More specifically, the diameter of the first and second inner through-hole conductors 51, 52 may be about 150 to 200 μm, while the diameter of the first and second outer through-hole conductors 61, 62 may be about 50 to 80 μm.

In the laminated capacitor with the first and second internal electrodes connected to the first and second terminal electrodes 31, 32 through the first and second outer through-hole conductors 61, 62, since high-frequency currents flow in opposite directions, magnetic fields cancel out each other, thereby reducing ESL.

In addition, since the first terminal electrodes 31 are connected only to the outermost first internal electrode 411 and the second terminal electrodes 32 are connected only to the outermost second internal electrode 421, the number of through-holes may be fewer than those of JP 2004-172602, facilitating the manufacture of the laminated capacitor.

Moreover, since the first inner through-hole conductor 51 connects the first internal electrodes 411-41$n$ to one another and the second inner through-hole conductor 52 connects the second internal electrodes 421-42$n$ to one another, a large capacitance can be obtained between the first internal electrodes 411-41$n$ and the second internal electrodes 421-42$n$.

In the laminated capacitor shown in FIGS. 1 and 2, the number of the first and second inner through-hole conductors 51, 52 is fewer than the number of the first and second outer through-hole conductors 61, 62. This prevents substantial reduction of the area where the first and second internal electrodes 411-41$n$, 421-42$n$ are opposed to each other, thereby enabling to obtain a large capacitance.

In the laminated capacitor shown in FIGS. 1 and 2, more particularly, there is only one pair of first and second inner through-hole conductors 51, 52. Decreasing the number of the through-hole conductors also facilitates the manufacture of the laminated capacitor to reduce the cost. Since the laminated capacitor can easily be manufactured, moreover, insulation failure and short-circuit fault can be reduced to improve yields.

Since the first and second inner through-hole conductors 51, 52 are of a larger cross section than the first and second outer through-hole conductors 61, 62, excellent continuity can be ensured even though the number of the first and second inner through-hole conductors 51, 52 is decreased. This prevents poor connection. In addition, ESL can be reduced by increasing the cross section.

Since the laminated capacitor has a simple structure with only the outermost first and second internal electrodes 41, 42 connected to the first and second terminal electrodes 31, 32 through the first and second outer through-hole conductors 61, 62, it can be manufactured in a continuous process. Therefore, the laminated capacitor can be manufactured more easily than the laminated capacitor of JP 2004-172602, which requires the first and second capacitors to be prepared separately and assembled later.

With the pair of the first and second inner through-hole conductors 51, 52 centered on the first and second internal electrodes 411-41$n$, 421-42$n$, furthermore, the current can be uniformly distributed to reduced ESL. In the illustrated embodiment, still furthermore, since the first and second inner through-hole conductors 51, 52 are disposed adjacent each other, ESL can be reduced much more.

Figure 3:
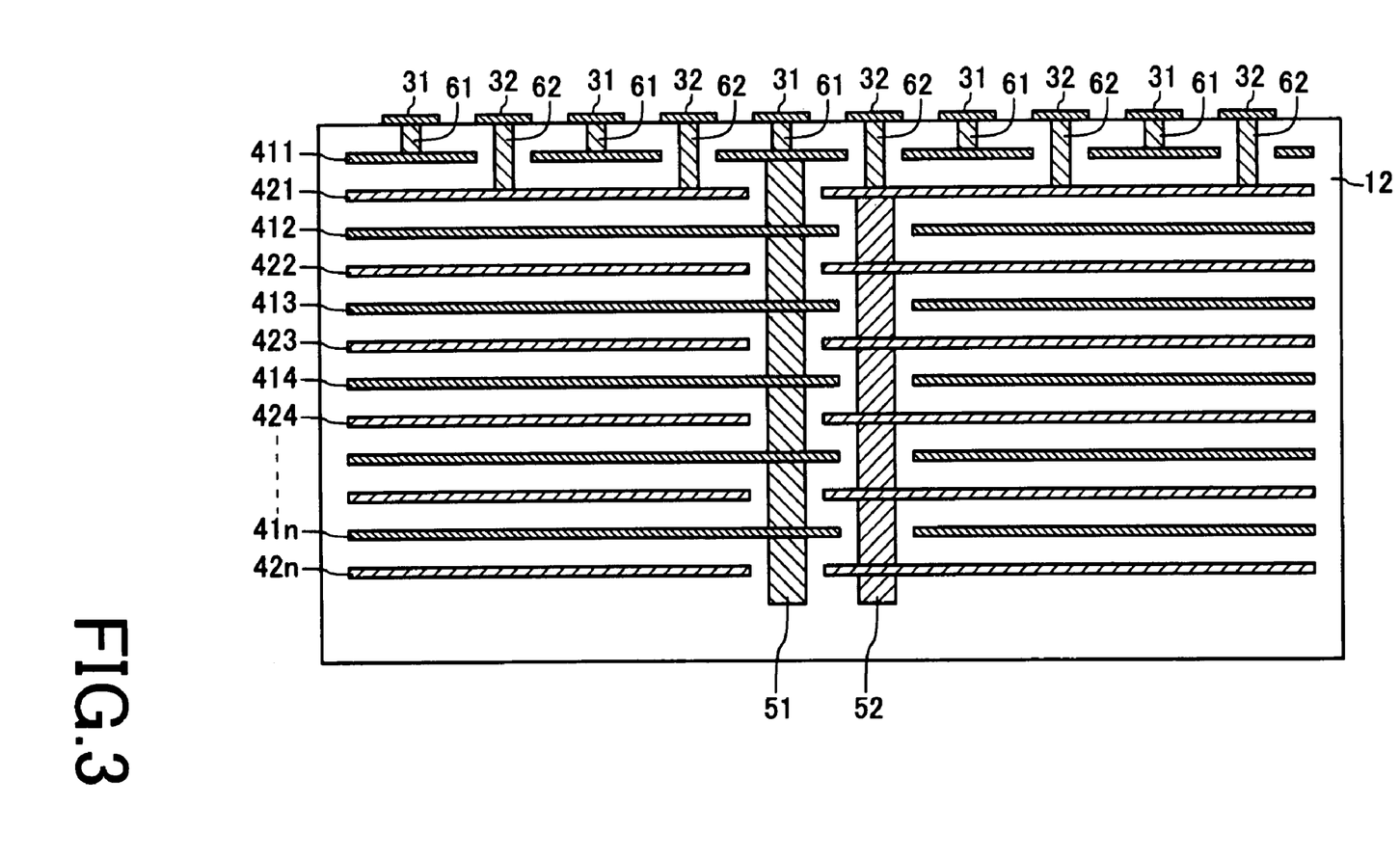
FIG. 3 is a sectional view showing a laminated capacitor according to another embodiment of the present invention.
Figure 4:
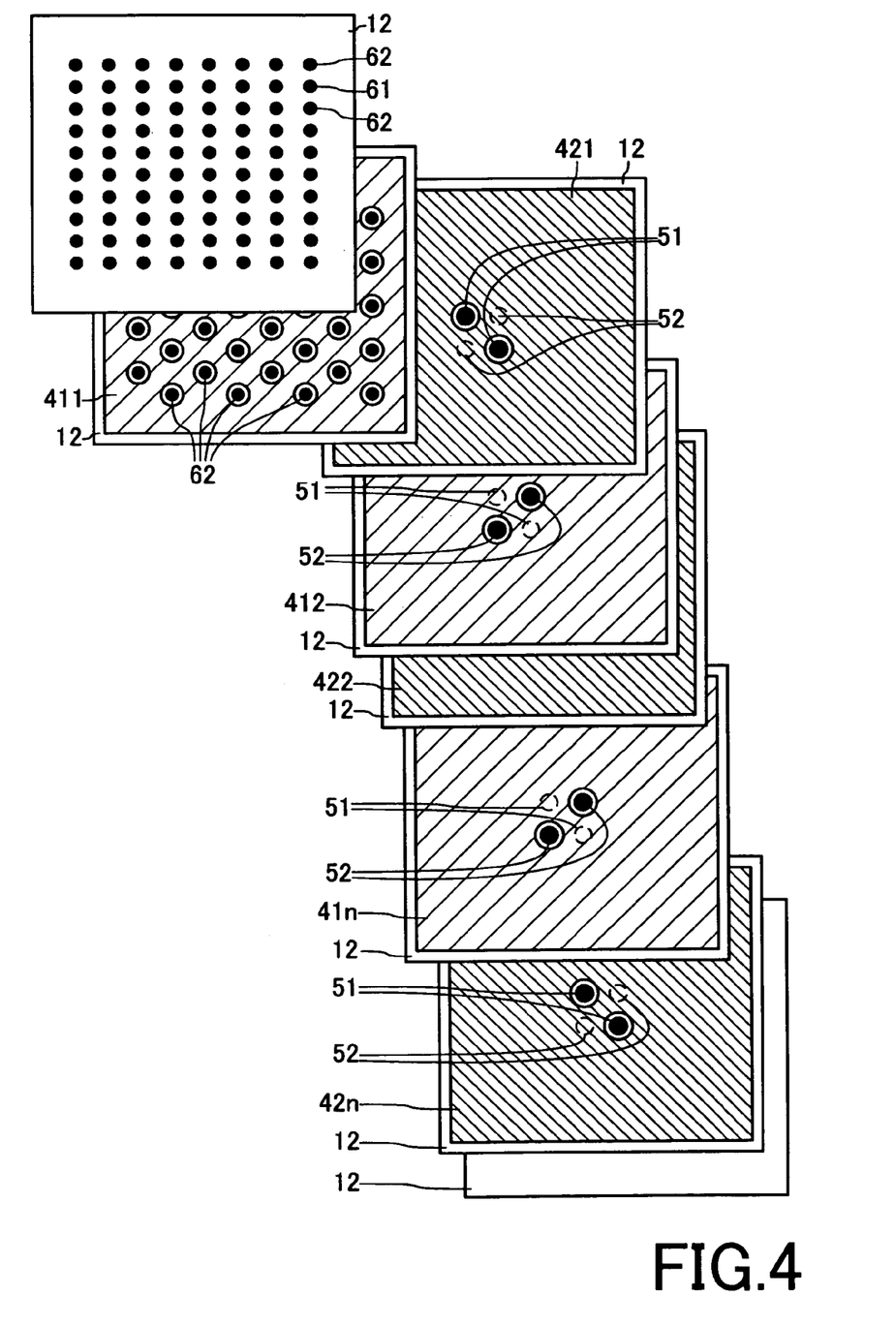
FIG. 4 is an exploded plan view of the laminated capacitor shown in FIG. 3.

FIG. 3 is a sectional view showing a laminated capacitor according to another embodiment of the present invention, and FIG. 4 is an exploded plan view of the laminated capacitor shown in FIG. 3. In FIG. 4, however, the terminal electrodes are omitted. In the following figures, the components similar to those of FIGS. 1 and 2 are designated by the same reference numerals, and duplicate description is omitted.

The laminated capacitor shown in FIGS. 3 and 4 differs from the laminated capacitor shown in FIGS. 1 and 2 in that there are provided two pairs of first and second inner through-hole conductors 51, 52. In this embodiment, the first and second inner through-hole conductors 51, 52 are disposed adjacent one another and centered on the first and second internal electrodes 411-41n, 421-42n.

Providing the two pairs of first and second inner through-hole conductors 51, 52 centrally of the first and second internal electrodes 411-41n, 421-42n further reduces the possibility of insulation failure.

Figure 5:
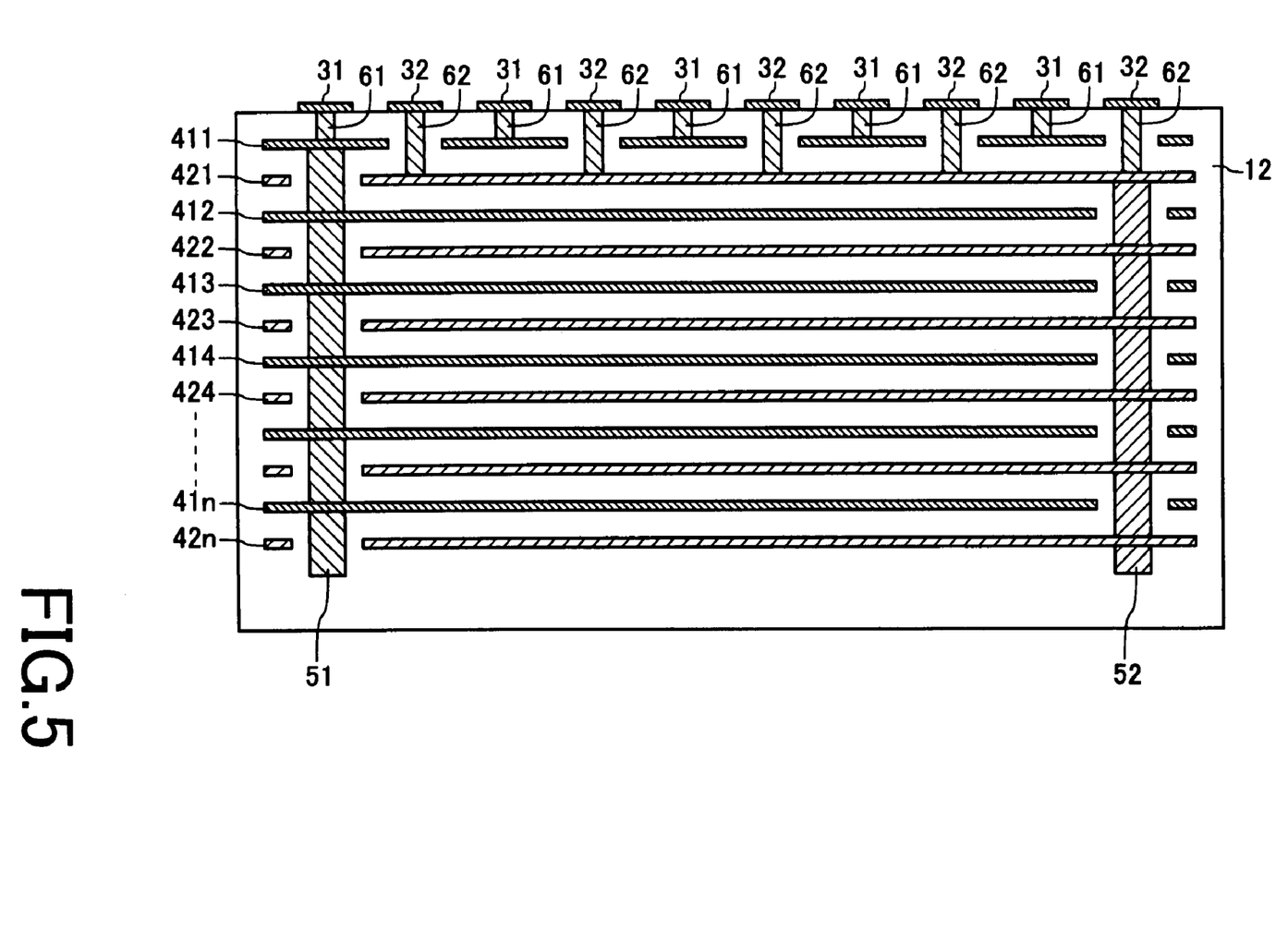
FIG. 5 is a sectional view showing a laminated capacitor according to still another embodiment of the present invention.
Figure 6:
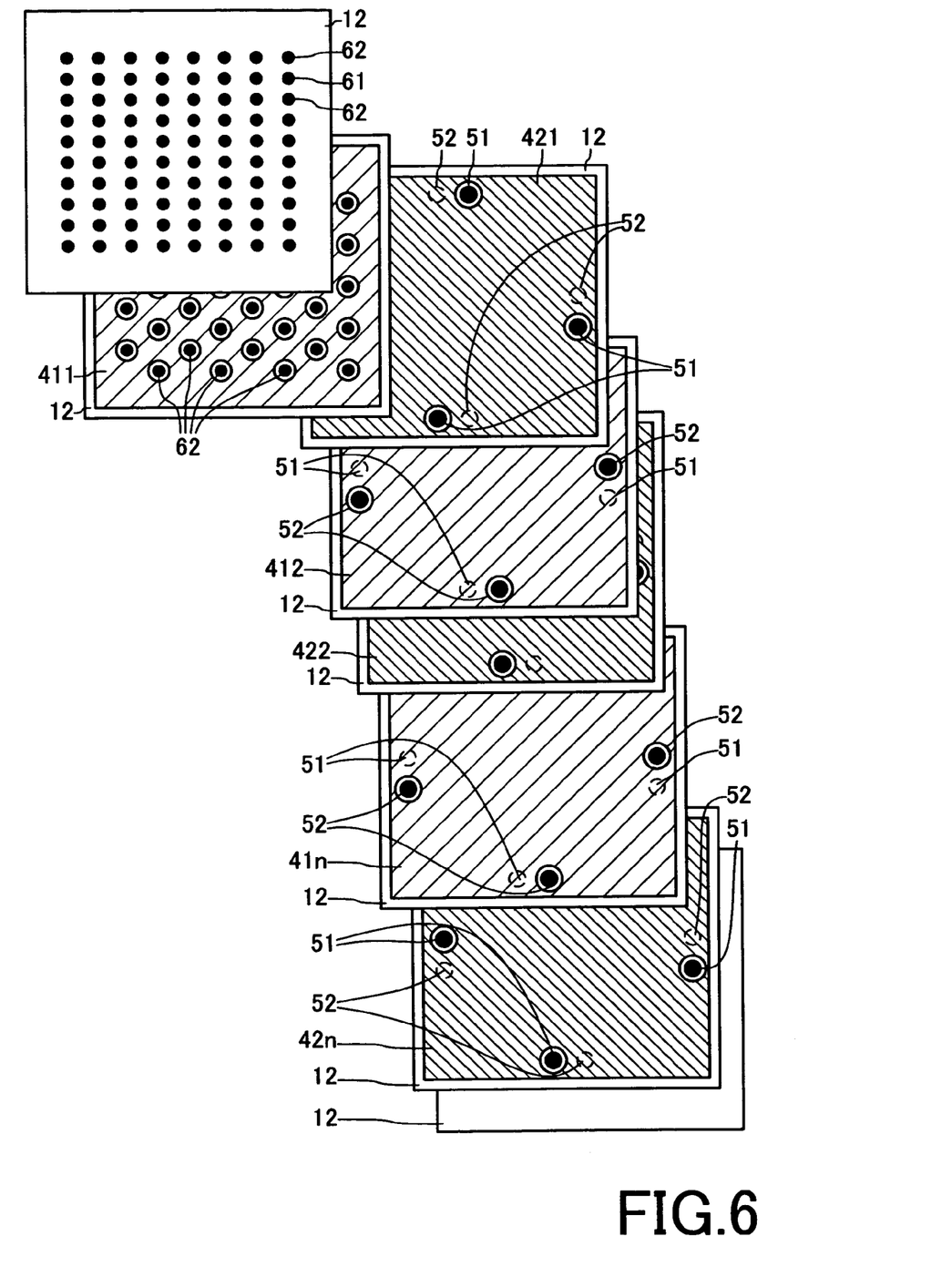
FIG. 6 is an exploded plan view of the laminated capacitor shown in FIG. 5.

FIG. 5 is a sectional view showing a laminated capacitor according to still another embodiment of the present invention, and FIG. 6 is an exploded plan view of the laminated capacitor shown in FIG. 5. In FIG. 6, however, the terminal electrodes are omitted. The laminated capacitor shown in FIGS. 5 and 6 differs from the laminated capacitors shown in FIGS. 1 to 4 in that there are provided four pairs of first and second inner through-hole conductors 51, 52.

In this embodiment, the first and second inner through-hole conductors 51, 52 of each pair are disposed adjacent each other and adjacent the peripheries of the first and second internal electrodes 411-41n, 421-42n as seen in the thickness direction of the dielectric body 12.

Providing the four pairs of first and second inner through-hole conductors 51, 52 further reduces the possibility of insulation failure.

2. First Method for Manufacturing the Laminated Capacitor

Figure 7:
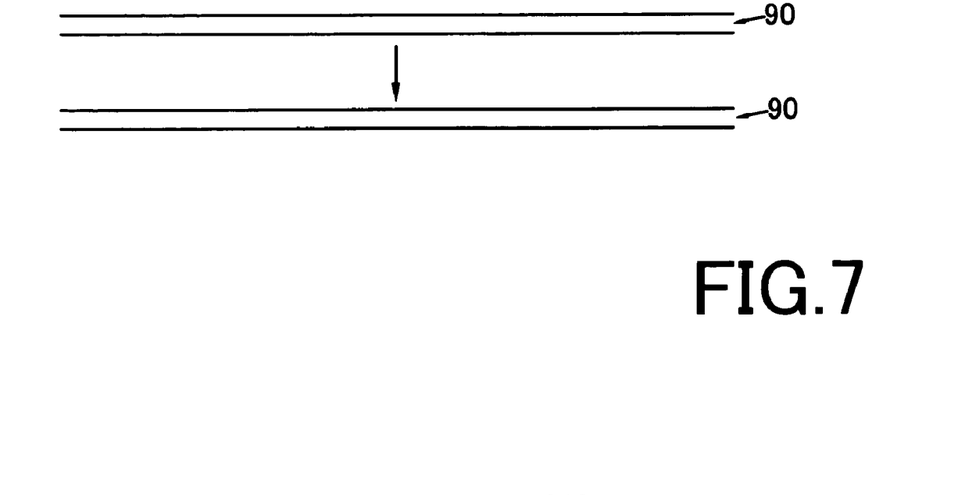
FIG. 7 is a diagram showing a step of a first method for manufacturing a laminated capacitor according to one embodiment of the present invention.

Referring now to FIGS. 7 to 11, here will be described a first method for manufacturing a laminated capacitor according to one embodiment of the present invention. In the illustrated manufacturing method, firstly, a plurality of green sheets 90 are prepared and stacked as shown in FIG. 7 to provide the dielectric body 12 shown in FIGS. 1 and 2.

Figure 8:
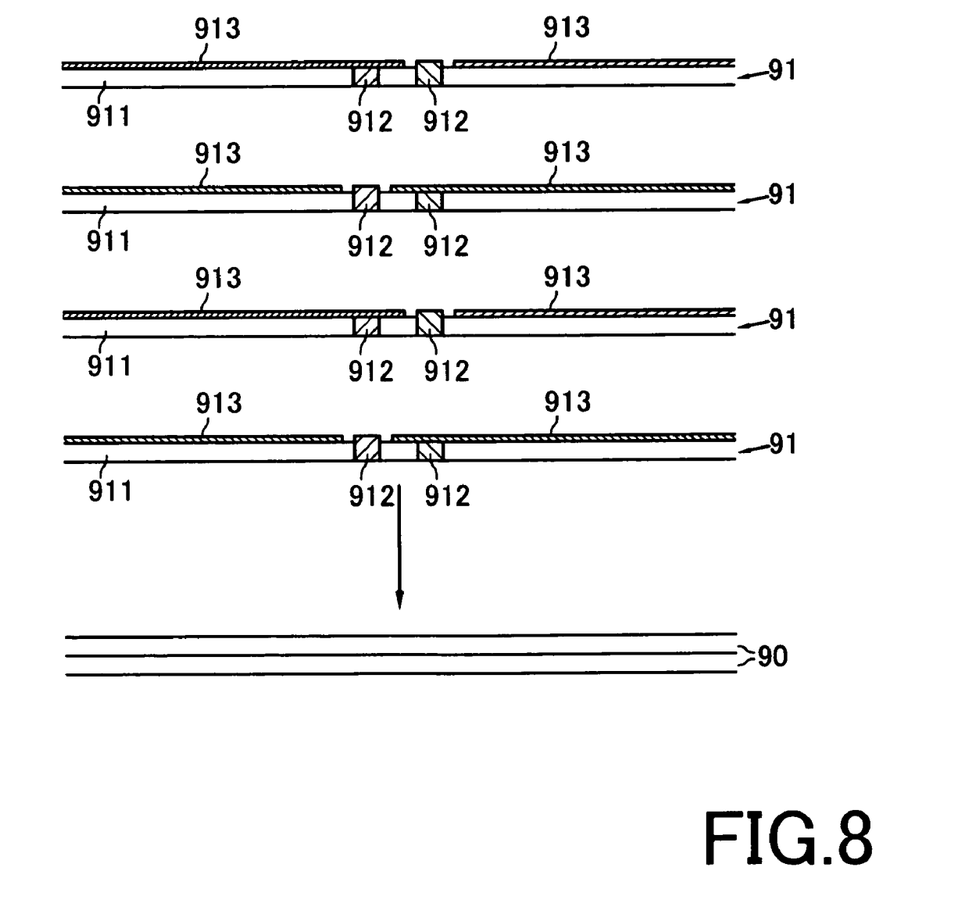
FIG. 8 is a diagram showing a step subsequent to the step of FIG. 7.

Secondly, a plurality of first green sheets 91 are prepared and stacked on the stack of the green sheets 90 as shown in FIG. 8. The first green sheet 91 has a first conductive layer 913 on a first dielectric layer 911 with first through-hole conductors 912. The first through-hole conductors 912 are configured to provide the first and second inner through-hole conductors 51, 52 shown in FIGS. 1 and 2, the first dielectric layer 911 is configured to provide the dielectric body 12 shown in FIGS. 1 and 2, and the first conductive layer 913 is configured to provide the first and second internal electrodes 412-41n, 421-42n shown in FIGS. 1 and 2.

Figure 9:
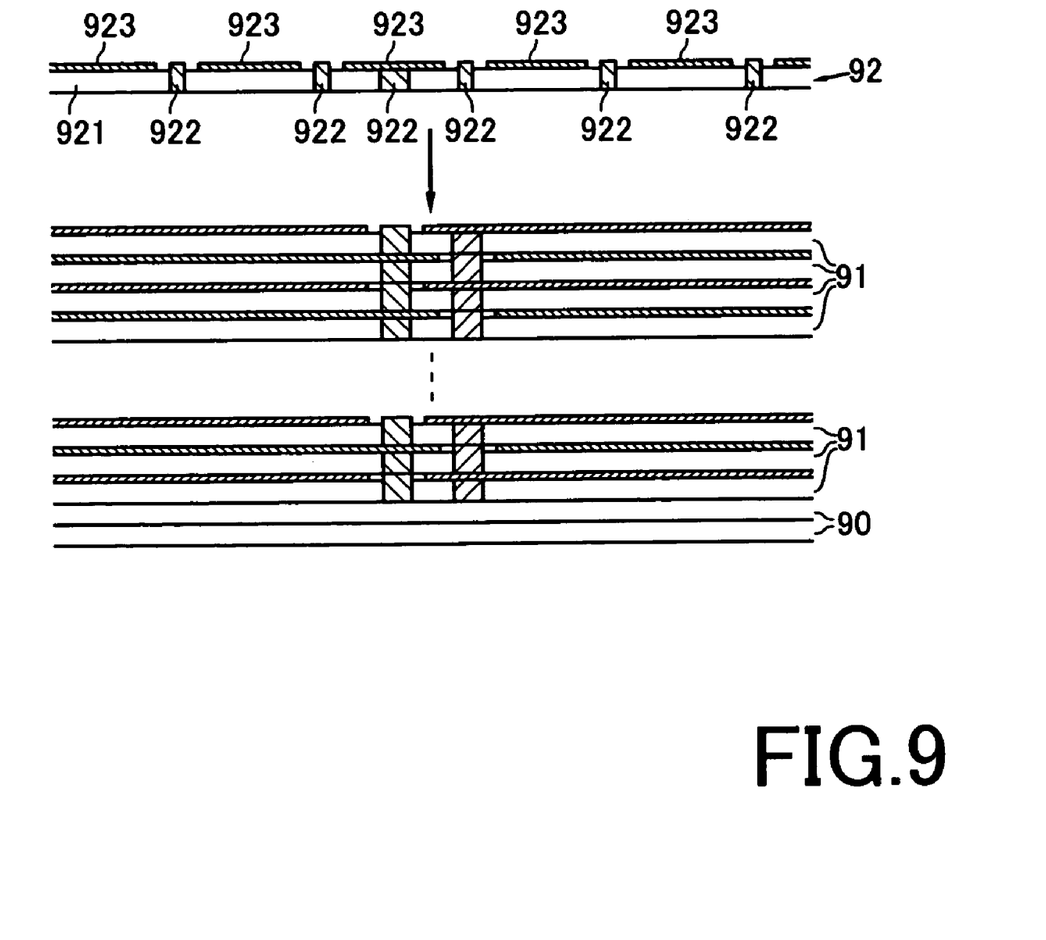
FIG. 9 is a diagram showing a step subsequent to the step of FIG. 8.

Thirdly, a second green sheet 92 is placed on the stack of the first green sheets 91 as shown in FIG. 9. The second green sheet 92 has a second conductive layer 923 on a second dielectric layer 921 with second through-hole conductors 922. The second through-hole conductors 922 are configured to provide the first inner through-hole conductor 51 and the second outer through-hole conductors 62 shown in FIGS. 1 and 2, the second dielectric layer 921 is configured to provide the dielectric body 12 shown in FIGS. 1 and 2, and the second conductive layer 923 is configured to provide the first internal electrode 411 shown in FIGS. 1 and 2.

Figure 10:
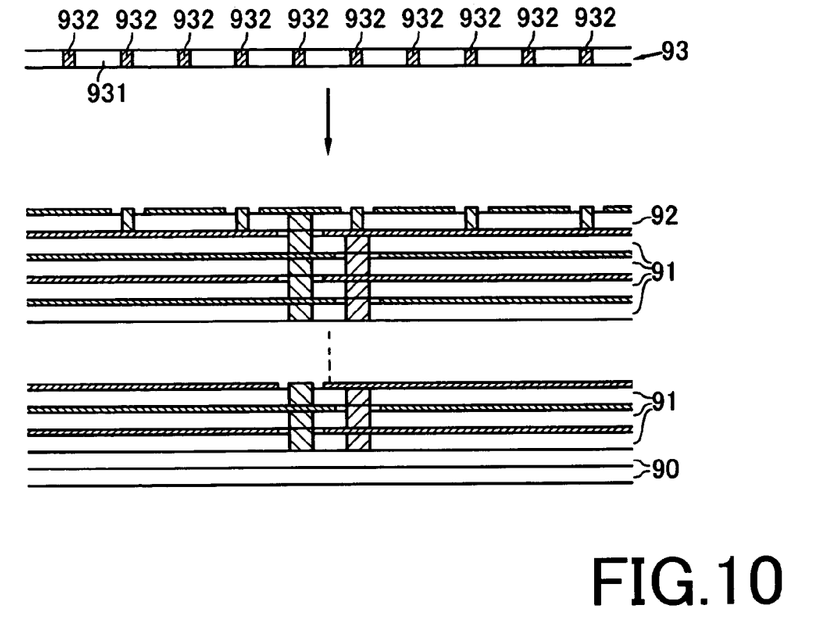
FIG. 10 is a diagram showing a step subsequent to the step of FIG. 9.

Fourthly, a third green sheet 93 is placed on the second green sheet 92 as shown in FIG. 10. The third green sheet 93 has third through-hole conductors 932 in a third dielectric layer 931. The third through-hole conductors 932 are configured to provide the first and second outer through-hole conductors 61, 62 shown in FIGS. 1 and 2, and the third dielectric layer 931 is configured to provide the dielectric body 12 shown in FIGS. 1 and 2.

Figure 11:
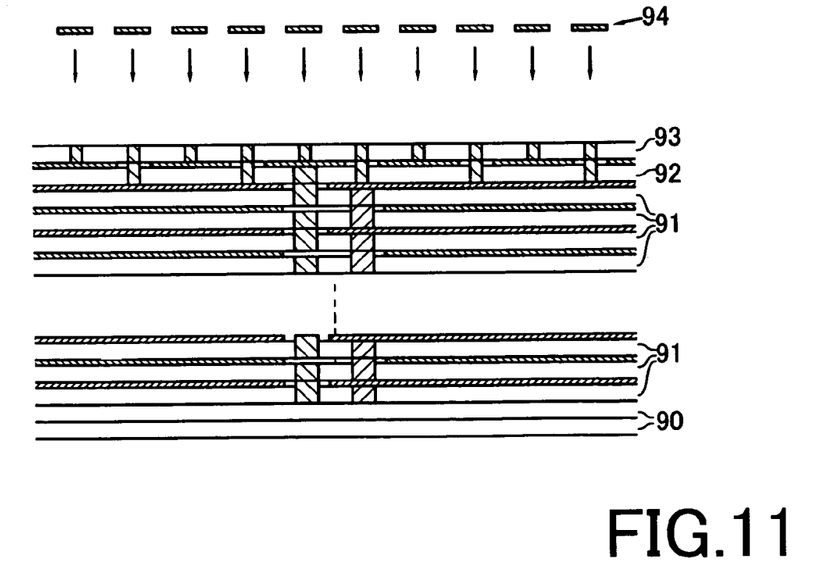
FIG. 11 is a diagram showing a step subsequent to the step of FIG. 10.

Finally, a fourth conductive layer 94 is formed on the placed third green sheet 93 as shown in FIG. 11 to provide the first and second terminal electrodes 31, 32 shown in FIG. 1. Thus, the laminated capacitor shown in FIGS. 1 and 2 can be obtained.

It should be noted that the fourth conductive layer 94 may be formed on the third dielectric layer 931 before placing the third green sheet 93 on the second green sheet 92 or after burning the first to third green sheets 91-93.

According to the first manufacturing method, as set forth above, the laminated capacitor can be manufactured in a continuous process. Thus, the first manufacturing method is better than the manufacturing method of JP 2004-172602, which requires the first and second capacitors to be prepared separately and assembled later.

According to the first manufacturing method, moreover, the laminated capacitor can be manufactured with no local increase in ceramic layer thickness, unlike the manufacturing method of JP 2004-172602, which doubles the ceramic layer thickness at the joint between the first and second capacitors. Thus, the thickness of the laminated capacitor can easily be reduced, while the capacity of the laminated capacitor can easily be increased.

3. Second Method for Manufacturing the Laminated Capacitor

Figure 12:
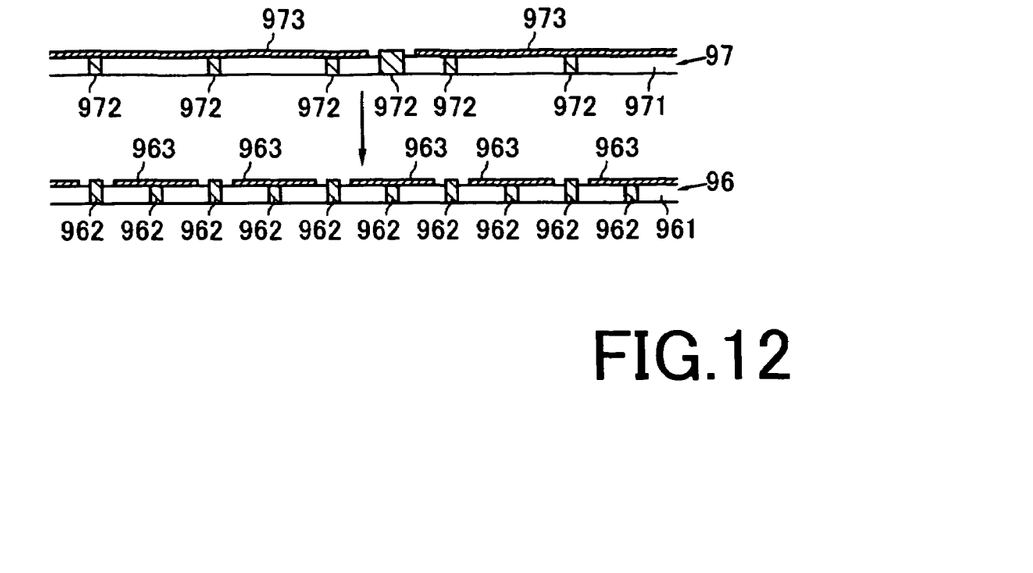
FIG. 12 is a diagram showing a step of a second method for manufacturing a laminated capacitor according to one embodiment of the present invention.

Referring now to FIGS. 12 to 15, here will be described a second method for manufacturing a laminated capacitor according to one embodiment of the present invention. Firstly, a first green sheet 96 is prepared and placed as shown in FIG. 12. The first green sheet 96 has a first conductive layer 963 on a first dielectric layer 961 with first through-hole conductors 962. The first through-hole conductors 962 are configured to provide the first and second outer through-hole conductors 61, 62 shown in FIGS. 1 and 2, the first dielectric layer 961 is configured to provide the dielectric body 12 shown in FIGS. 1 and 2, and the first conductive layer 963 is configured to provide the first internal electrode 411 shown in FIGS. 1 and 2.

Secondly, a second green sheet 97 is placed on the first green sheet 96. The second green sheet 97 has a second conductive layer 973 on a second dielectric layer 971 with second through-hole conductors 972. The second through-hole conductors 972 are configured to provide the first inner through-hole conductor 51 and the second outer through-hole conductors 62 shown in FIGS. 1 and 2, the second dielectric layer 971 is configured to provide the dielectric body 12 shown in FIGS. 1 and 2, and the second conductive layer 973 is configured to provide the second internal electrode 421 shown in FIGS. 1 and 2.

Figure 13:
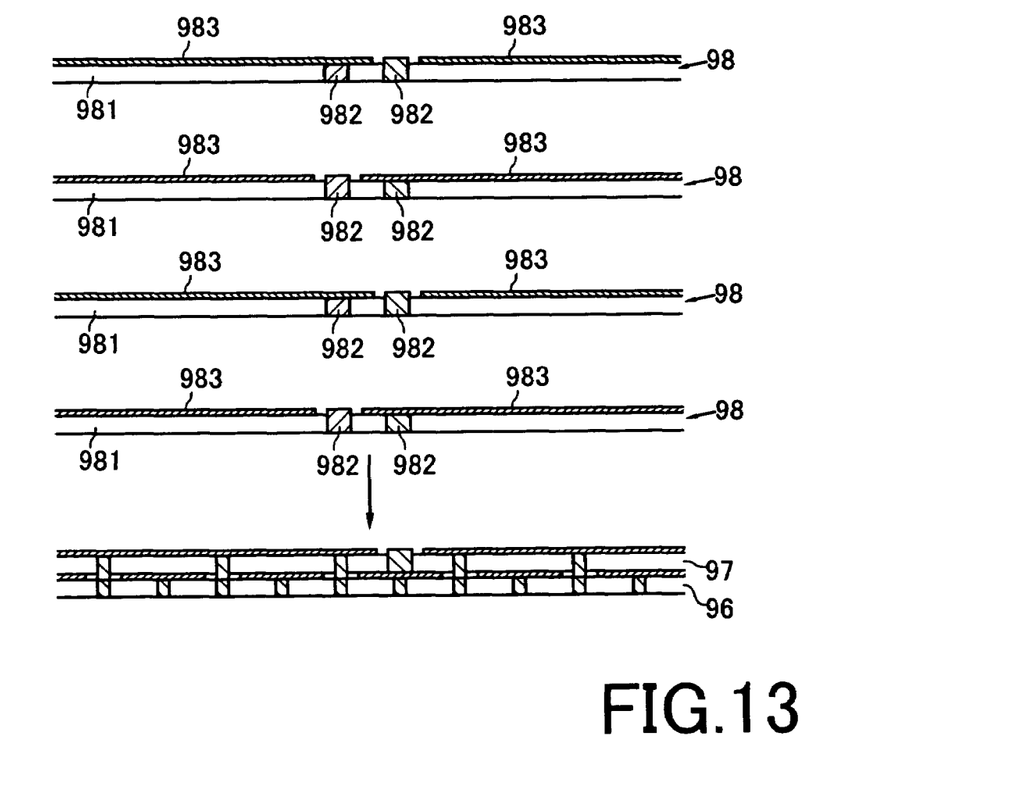
FIG. 13 is a diagram showing a step subsequent to the step of FIG. 12.

Thirdly, a plurality of third green sheets 98 are stacked on the second green sheet 97 as shown in FIG. 13. The third green sheet 98 has a third conductive layer 983 on a third dielectric layer 981 with third through-hole conductors 982. The third through-hole conductors 982 are configured to provide the first and second inner through-hole conductors 51, 52 shown in FIGS. 1 and 2, the third dielectric layer 981 is configured to provide the dielectric body 12 shown in FIGS. 1 and 2, and the third conductive layer 983 is configured to provide the first and second internal electrodes 412-41n, 422-42n shown in FIGS. 1 and 2.

Figure 14:
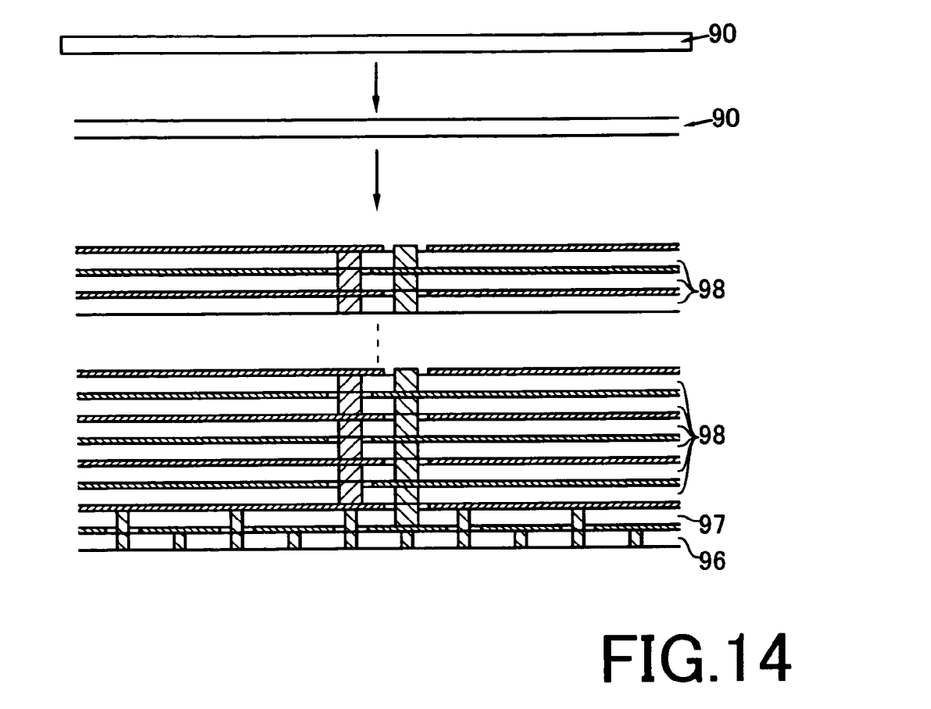
FIG. 14 is a diagram showing a step subsequent to the step of FIG. 13.

Fourthly, a plurality of green sheets 90 are stacked on the stack of the third green sheets 98 as shown in FIG. 14 to provide the dielectric body 12 shown in FIGS. 1 and 2.

Figure 15:
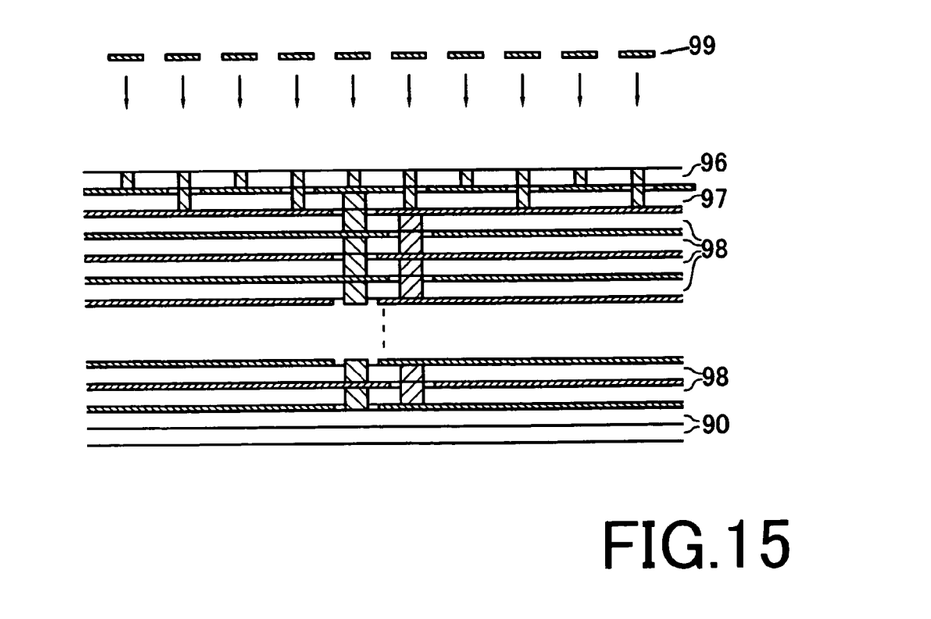
FIG. 15 is a diagram showing a step subsequent to the step of FIG. 14.

Finally, a fourth conductive layer 99 is formed on the first green sheet 96 as shown in FIG. 15 to provide the first and second terminal electrodes 31, 32 shown in FIG. 1. Thus, the laminated capacitor shown in FIGS. 1 and 2 can be obtained. It should be noted that the fourth conductive layer 99 may be formed before or after burning the first to third green sheets 96-98.

The second manufacturing method has the same advantages as the first manufacturing method.

While the present invention has been particularly shown and described with reference to embodiments thereof, it will be understood by those skilled in the art that various changes in form and detail may be made therein without departing from the spirit, scope and teaching of the invention.

What is claimed is:

1. A laminated capacitor comprising:
   a dielectric body;
   a plurality of first terminal electrodes arranged at intervals on one surface of said dielectric body;
   a plurality of second terminal electrodes arranged at intervals on said surface of said dielectric body;
   a plurality of first internal electrodes arranged in layers within said dielectric body;
   a plurality of second internal electrodes arranged in layers within said dielectric body to alternate with said first internal electrodes;
   a plurality of first outer through-hole conductors each connecting each first terminal electrode to one first internal electrode which is located closest to said surface of said dielectric body among said first internal electrodes;
   a plurality of second outer through-hole conductors each connecting each second terminal electrode to one second internal electrode which is located closest to said surface of said dielectric body among said second internal electrodes;
   a first inner through-hole conductor connecting said first internal electrodes to one another; and
   a second inner through-hole conductor connecting said second internal electrodes to one another.

2. The laminated capacitor of claim 1, wherein said first and second inner through-hole conductors are of a larger cross section than said first and second outer through-hole conductors.

3. The laminated capacitor of claim 1, wherein a pair of said first and second inner through-hole conductors are centered on said first and second internal electrodes.

4. The laminated capacitor of claim 3, wherein said first and second inner through-hole conductors are disposed adjacent each other.

5. The laminated capacitor of claim 1, wherein at least two pairs of said first and second inner through-hole conductors are centered on said first and second internal electrodes.

6. The laminated capacitor of claim 5, wherein said first and second inner through-hole conductors in each pair are disposed adjacent each other.

7. The laminated capacitor of claim 1, wherein at least two pairs of said first and second inner through-hole conductors are disposed adjacent peripheries of said first and second internal electrodes.

8. A method for manufacturing the laminated capacitor of claim 1, comprising:
   stacking a plurality of first green sheets, each said first green sheet having a first conductive layer on a first dielectric layer with first through-hole conductors, said first through-hole conductors being configured to provide said first and second inner through-hole conductors, said first dielectric layer being configured to provide said dielectric body, said first conductive layer being configured to provide said first and second internal electrodes;
   placing a second green sheet on a stack of said first green sheets, said second green sheet having a second conductive layer on a second dielectric layer with second through-hole conductors, said second through-hole conductors being configured to provide said first inner through-hole conductor and said second outer through-hole conductors, said second dielectric layer being configured to provide said dielectric body, said second conductive layer being configured to provide said one first internal electrode; and
   placing a third green sheet on said second green sheet, said third green sheet having third through-hole conductors in a third dielectric layer, said third through-hole conductors being configured to provide said first and second outer through-hole conductors, said third dielectric layer being configured to provide said dielectric body.

9. The method of claim 8, which further includes forming a fourth conductive layer on said placed third green sheet to provide said first and second terminal electrodes.

10. A method for manufacturing the laminated capacitor of claim 1, comprising:
    placing a first green sheet, said first green sheet having a first conductive layer on a first dielectric layer with first through-hole conductors, said first through-hole conductors being configured to provide said first and second outer through-hole conductors, said first dielectric layer being configured to provide said dielectric body, said first conductive layer being configured to provide said one first internal electrode;
    placing a second green sheet on said first green sheet, said second green sheet having a second conductive layer on a second dielectric layer with second through-hole conductors, said second through-hole conductors being configured to provide said first inner through-hole conductor and said second outer through-hole conductors, said second dielectric layer being configured to provide said dielectric body, said second conductive layer being configured to provide said one second internal electrode; and
    stacking a plurality of third green sheets on said second green sheet, each said third green sheet having a third conductive layer on a third dielectric layer with third through-hole conductors, said third through-hole conductors being configured to provide said first and second inner through-hole conductors, said third dielectric layer being configured to provide said dielectric body, said third conductive layer being configured to provide said first and second internal electrodes.

* * * * *